INVENTORS E. G. ANDREWS
O. CESAREO
BY
ATTORNEY

April 6, 1948.  E. G. ANDREWS ET AL  2,438,888
RADIO OBJECT DETECTOR TRAINING DEVICE
Filed Dec. 6, 1943  2 Sheets-Sheet 2
FIG. 2
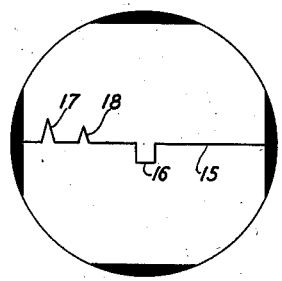
FIG. 3
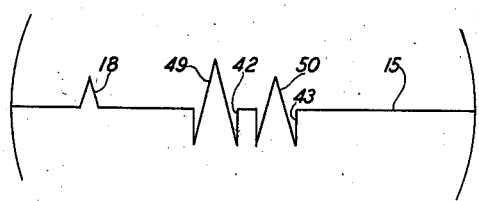
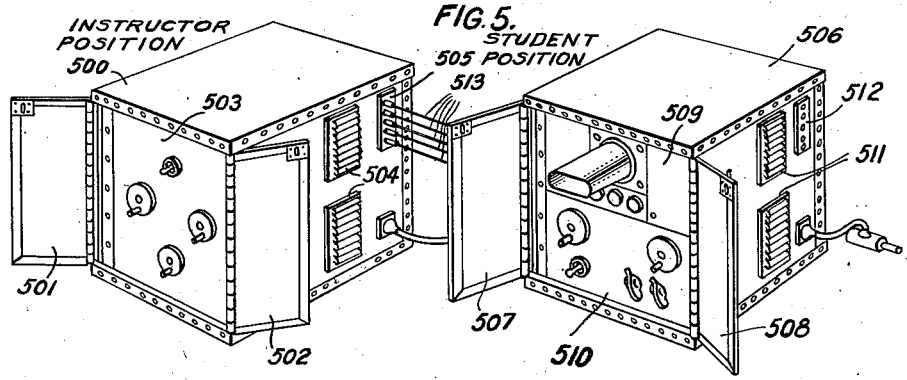
FIG. 5.
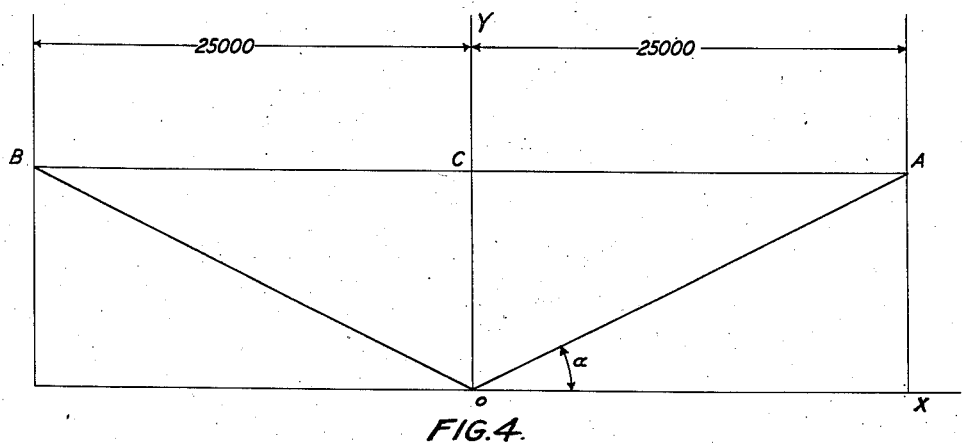
FIG. 4.
INVENTORS E. G. ANDREWS
O. CESAREO
BY
ATTORNEY Patented Apr. 6, 1948

2,438,888

UNITED STATES PATENT OFFICE 2,438,888

RADIO OBJECT DETECTOR TRAINING DEVICE

Ernest G. Andrews, Baldwin, N. Y., and Orfeo Cesareo, Washington Township, Bergen County, N. J., assignors to Bell Telephone Laboratories, Incorporated, New York, N. Y., a corporation of New York Application December 6, 1943, Serial No. 513,042

6 Claims. (Cl. 35—10)

This invention relates to signaling systems and apparatus and particularly to signaling systems and apparatus utilized for the location of distant objects.

An object of the invention is to simulate in terms of variable electrical quantities the movement of an imaginary object in space and to utilize these electrical quantities to train a student in the art of locating real objects.

Another object is to display before the student an indication representing the movement of an imaginary object and to enable him to follow or track the imaginary object along its course.

Another object is to display before the student visual indications representing the range and angular location of the imaginary moving object in its course and also to display indications of imaginary fixed objects.

Another object is to give the student the illusion of tracking a real object moving in space by causing the visual indications which represent the movement and location of an imaginary object and also the indications representing imaginary fixed objects to appear and behave in the same manner that they would if he were manipulating an object locating device to follow the movement of a real object.

Object locating systems have been devised for obtaining a continuous derivation of the location of an airplane or other object moving at a variable speed along a variable course in space. In one such system directive radio impulses, derived from a source of base phase and frequency, are transmitted from the point of observation to the airplane, from which they return as echo impulses. These returning impulses are received and utilized to form a sharp irregularity or pip in the linear trace on the screen of an oscilloscope. As the airplane moves and changes its range from the reference point, the travel time of the echo impulse changes, and the pip on the oscilloscope screen moves correspondingly along the linear trace. Waves from the same base source are also directed through a phase shifter and utilized to form a reference notch or other mark in the oscilloscope trace, and the phase shifter is provided with a hand-wheel or other manual adjusting device by which the operator can adjust the phase of the impulses forming the reference notch to coincide with the phase of the returning echo pulses. The effect is to cause the reference notch to follow the echo pip, and the angular position of the manual phase controlling device is then a measure of the range of the moving airplane. Furthermore, the directivity of the receiving antenna is utilized to produce a pair of vertical marks or pips in an oscillograph trace, the relative amplitudes of which are a measure of the azimuth or elevation angle according to the orientation of the antenna; and the operator is provided with a second hand-wheel which he manipulates to introduce compensating potentials, the effect of which is to equalize the amplitudes of said marks. If he manipulates his hand-wheel accurately, the marks appear of equal amplitudes, and the instant position of the hand-wheel is an exact measure of the azimuth or elevation angle as the case may be.

Since the accuracy of the information obtained from these object locating systems depends largely upon the proficiency of the operators, it is desirable to give these operators a preliminary course of training under conditions which simulate as closely as possible the actual conditions which they will ultimately encounter in operating the object locating systems. According to the present invention, therefore, students are trained in the art of operating object locating systems by means of a training system in which an instructor's position is equipped with means for producing varying electrical quantities representing the range and azimuth angles of an imaginary object moving along a chosen imaginary course in space, in which these varying electrical quantities are utilized to produce on the trace of an oscilloscope object marks or pips representing range and azimuth and having the same appearance to the student as they would if he were operating an object locating system to track a real airplane or other object moving through space.

More specifically, a feature of the invention is a system in which a source of oscillations of base frequency and phase is provided and a wave from this source is subjected to a continuing shift of phase by a phase shifter at the instructor's position to represent the changing range with respect to the point of observation of the imaginary object moving along its course. This wave of changing phase is then utilized to cause the recurring sweep of an oscilloscope beam to produce the visible linear trace on the screen, the phase of which corresponds exactly with the changing range of the imaginary object. Moreover, this same wave of changing phase is utilized to generate a small irregularity in the trace serving as a reference mark and having the appearance of a stationary notch located in the center of the trace. Also a small object mark or pip is produced on the oscilloscope screen which moves along the notched trace to represent the changing range of the imaginary object and corresponds to the mark produced by the returning echo pulse in the object locating system. To this end a wave of the base phase is conducted through a phase shifter at the student's position and is then utilized to produce sharp impulses corresponding to the returning echo pulses which are applied to the oscilloscope to generate the echo or object mark on the screen. Since these echo pulses are in phase with the source and since the sweep wave is undergoing a continuing phase change corresponding to the changing range, the echo mark on the screen moves along the trace to indicate the changing range. The student's position is provided with a manual device, such as a hand-wheel, for operating the phase shifter to introduce a shift in the phase of the wave from which the echo pulses are generated. If, therefore, the student introduces the correct degree of phase shift, the effect is to hold the echo mark in juxtaposition to the stationary notch in the oscilloscope trace. When the mark is in exact coincidence with the notch, the position of the student's control wheel is an exact measure of the range of the moving object at that instant, and his proficiency is determined by the percentage of time that he is able to hold the echo mark in the notch.

According to another feature of the invention, the wave of varying phase corresponding to range may be utilized at the will of the student to produce two stationary reference marks or notches in the oscilloscope trace and also to produce two stationary peaked object marks or pips which are located respectively in said notches. Since the voltages which produce the oscilloscope trace, the notches in the trace, and the peaked marks are all subjected to the same changing phase, it follows that the notches remain stationary on the oscilloscope screen and that the marks are accurately located in these notches. In order that these marks may represent the azimuth angle locating the imaginary object, a wave from the base source, after passing through the instructor's range phase shifter, is applied to a voltage control device at the instructor's position which introduces a continuing variation in said wave corresponding to the continuously changing azimuth angle of the moving imaginary object. This azimuth wave is then utilized to form with varying relative amplitudes the two marks resting in the notches of the oscilloscope trace, the difference in their amplitudes constituting a measure of the azimuth angle. In a similar manner the student's position is provided with a voltage control mechanism which he can manipulate and which serves to introduce a compensating change in said azimuth wave and, if the student follows the azimuth angle accurately, the neutralization is complete and the two marks on the oscilloscope trace assume equal amplitudes. By observing the amplitudes of these marks and operating his control wheel, he endeavors to hold them at equal amplitudes which indicates to him that the instantaneous position of his control wheel is a measure of the azimuth angle of the imaginary object.

Another feature of the invention is a system in which the movement of the range echo mark along the oscilloscope trace is effected by changing the phase of the sweep voltage in a manner to represent the range of the imaginary course being generated at the instructor's position, and in which the student, in order to track the range of the imaginary object holds the echo mark in juxtaposition with the stationary reference notch by manually varying the phase of the wave from which the echo mark is produced. In this manner it is possible to enhance the effectiveness of the illusion and to portray on the screen marks representing imaginary fixed objects, which happen to fall within the scope of the locating system, concurrently with the echo mark in which the student is interested, simply by utilizing a wave from the base source to generate these fixed object marks. Since the sweep voltage is undergoing a constant phase change, the fixed object marks will move along the trace on the screen as they would on the screen of an object-locating system when tracking the range of a real object moving in space.

These and other features of the invention will be discussed more fully in the following detailed specification.

In the drawings accompanying the specification:

Fig. 2 illustrates the oscilloscope screen on which the images appear;

Fig. 3 is an enlarged view of the screen and images;

Fig. 4 illustrates the courses that may be generated for the imaginary object that is being followed; and Fig. 5 illustrates the instructor's apparatus cabinet and one student's apparatus cabinet as they would be set up for training purposes.

Figure 1:
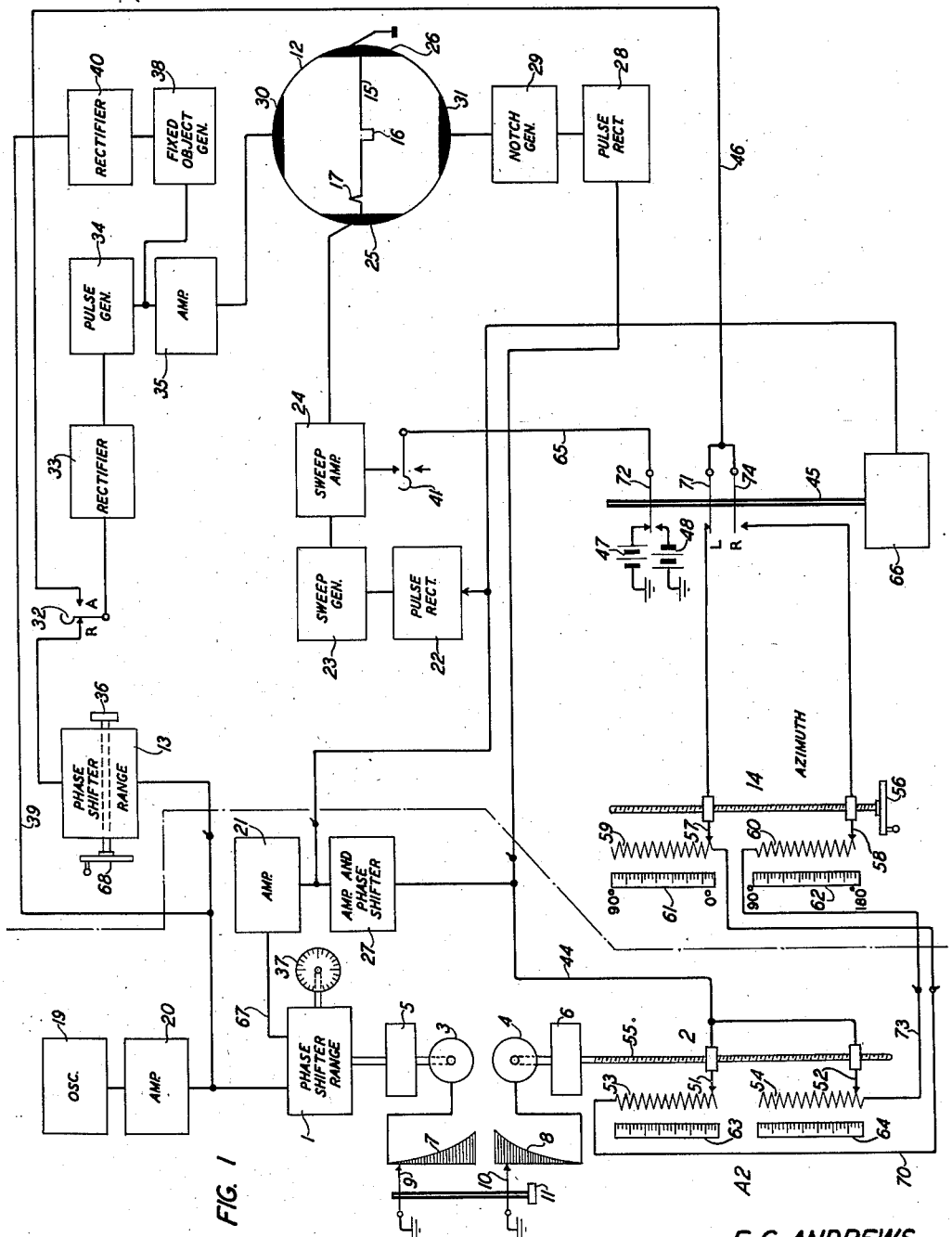
Fig. 1 is a circuit diagram of the training system including the equipment at the instructor's position and the equipment at one of the student's positions.

The three dimensions of primary interest in the location of a moving object, such as an airplane, are range, azimuth angle and ascension or elevation angle. In view of the close similarity from the operator's standpoint in the methods of deriving the azimuth and elevation angles it is considered sufficient for training purposes to omit one of these. It may be assumed, therefore, that the course generated by the imaginary object lies in the same horizontal plane which contains the reference point or point of observation, thus omitting the elevation angle. It may also be assumed that the course is a straight line and that the perpendicular bisector of this line includes the point of observation. For example, in Fig. 4 the course generated is represented by the line AB, and the point of observation O is located on the line OY which is perpendicular to and bisects the course line AB. It may also be assumed that the course line AB represents a flight of a definite distance (50,000 yards, for example). If the range is taken as the distance from the point O to the point of the imaginary object on the course line AB, such as the distance OA when the object is at the starting point A, and if the azimuth angle is taken as the angle $\alpha$ formed between the range line OA and the axis OX, these dimensions will, of course, vary for different points along the course. As the imaginary object moves from the point A toward the axis OY, the range decreases from its initial range OA to its minimum value OC, and the azimuth angle $\alpha$ increases from its initial value to 90 degrees when the mid-point of the flight is reached. As the object continues in the second half of the course, the range again increases until it reaches its initial value OB, and the azimuth angle continues to increase until it reaches its final value 180°$\alpha$.

Referring now to Fig. 1, the training system includes an instructor's position (shown on the left of the broken line) and one or more students' positions (shown on the right) under the common supervision of the instructor. The instructor's position is equipped with means for generating the desired course of flight including a phase shifter 1 which varies the phase of an alternating wave in accordance with the changing value of the range, and a variable resistor 2 which varies the amplitude of an alternating wave in accordance with the changing value of the azimuth angle. The phase shifter 1 and resistor 2 may be operated respectively by motors 3 and 4 through suitable gear mechanisms 5 and 6. The motors 3 and 4 are driven at speeds which vary throughout the generation of the course in accordance with the varying rate of change of range and azimuth angle under the control of variable resistors 7 and 8. These resistors are designed to represent the changes in the range and azimuth angles of the course, and their varying values of resistance are introduced into the motor circuits by means of the movable contacts 9 and 10 which move over these resistors under the control of a common bar 11 manipulated by the instructor as he generates the course of flight.

The apparatus at the instructor's position is mounted in an apparatus cabinet 500, shown in Fig. 5, having front closure doors 501 and 502 and a control panel 503. The sides of the cabinet are provided with ventilation slots 504 and with cable jacks, such as 505, by which the instructor's cabinet may be connected with one or more students' positions.

Each student's position is equipped with an oscilloscope 12 having a luminescent screen on which images are formed representative of the changing range and azimuth angle of the imaginary object moving along its simulated course in space. Also the student's position is provided with a manually operable phase shifter 13 which he manipulates to control certain images on the screen in his effort to follow the range of the moving object. Furthermore, the student is equipped with a variable resistor 14 which he manipulates to control other images on the oscilloscope screen in his effort to follow the azimuth angle of the moving object.

The range of the moving object is depicted to the student on the oscilloscope screen by means of a horizontal trace 15 having a reference mark, such as a notch 16, therein and a triangular shaped image mark or pip 17 which moves along the trace 15 in accordance with the movement of the object being followed. The notch 16 remains stationary on the screen and is located near the center of the horizontal trace 15. Although the image mark 17, if undisturbed, moves along the horizontal trace 15 in accordance with the changing range of the imaginary object, the student can arrest the movement of this image and hold it in a fixed position by the proper amount of manipulation of the phase shifter 13. His object, therefore, is to operate the phase shifter at a rate which is just sufficient to hold the image mark 17 within the stationary notch 16. Each instant that he maintains the image mark located in the notch 16 the position of his phase shifter 13 may be taken as a measure of the exact range from the point of observation to the imaginary object in its course.

The movement of the range mark 17 across the oscilloscope is effected by varying the phase of a wave, taken from the source, in accordance with the varying range of the object and utilizing this phase shifted wave to form the horizontal trace 15 on the oscilloscope and by utilizing a wave taken directly from the source to form the range image 17. This plan permits the student to control the movement of the image 17 by subjecting the wave that forms this image to the influence of the phase shifter 13 which the student manipulates. Moreover, it permits the formation of fixed object marks on the oscilloscope by waves taken directly from the source. In actual practice these fixed object marks appear on the oscilloscope, and they usually represent prominent stationary objects which happen to lie within the scope of the locating system. Although the objects themselves are stationary in space, the image marks representing them move along the oscilloscope trace while the operator is manipulating his mechanism to hold the image mark in which he is interested in the stationary notch 16. Therefore, in the present arrangement it is possible to enhance the illusion given the student by forming these fixed object marks from waves taken directly from the source. Although these waves are taken from the source of base phase the fixed object marks which they produce on the oscilloscope move by reason of the phase change to which the horizontal trace 15 is subjected. In Fig. 2 the image mark 17 represents the imaginary object in which the student is interested and the mark 18 represents a fixed object.

The apparatus at a student's position is mounted in an apparatus cabinet 506, shown in Fig. 5, having front closure doors 507 and 508, an oscilloscope panel 509 with controls therefor, and a control panel 510. The sides of the cabinet are provided with ventilation slots 511 and with cable jacks, such as 512, by which the cabinet may be connected by plug-ended cables 513 with the instructor's apparatus cabinet 500 and with other students' cabinets similar to cabinet 506.

The energy for operating the system is derived from a source of alternating current 19 of suitable frequency which is provided in common to the instructor's position and all of the students' positions. A wave taken from the source 19, after undergoing amplification by means of any suitable amplifier 20, is subjected to the phase shifter 1 which introduces into the wave a change of phase relative to that of the source 19, representing the changing range of the imaginary object in space. This alternating wave with its changing phase is then amplified by an amplifier 21 and utilized to produce the horizontal trace 15 on the screen of the oscilloscope 12. To this end the alternating wave taken from the amplifier 21 is rectified by any suitable rectifier 22 to produce a series of pulses of like polarity, each consecutive pair of pulses corresponding to a cycle of the alternating wave. These pulses are then applied to the sweep generator 23 which produces in the well-known manner the voltage wave necessary to sweep the beam of the oscilloscope 12 horizontally across the luminescent screen to form the visible trace 15 thereon. The output voltage from the generator 23 may be amplified if desired by an amplifier 24 before it is applied to the deflection plates 25 and 26 of the oscilloscope. Since the frequency of the sweep voltage is above the persistency of vision, the trace 15 appears as a permanent line across the screen of the oscilloscope. However, the commencement in time of each individual sweep of the beam bears a phase relation to the original source 19 which represents the range of the imaginary object. The manner in which this phase relation of the sweep voltage is utilized to move the image 17 will be discussed presently; but before doing so the formation of the stationary notch 16 should be described.

Being a reference mark, the notch 16 should remain stationary on the screen of the oscilloscope, and it is found to be convenient to have this notch located substantially in the center of the field. These requirements are achieved by utilizing a wave which has been subjected to the action of the phase shifter 1 for forming the notch in the horizontal trace 15. Accordingly, a wave taken from the output circuit of the amplifier 21 is applied to the device 27 which subjects it to a constant phase shift of 90 degrees and to introduce further amplification if desirable. Any of the well-known phase shifting and amplifying devices of the prior art may be used for this purpose. The output wave from the phase shifter 27 is now rectified by the rectifier 28 and is then applied to the notch generator 29. The generator 29, which may be of any suitable type, converts the rectified pulses into pulses having square tops and applies these latter pulses to the vertical deflection plates 30 and 31 of the oscilloscope. These square-topped pulses deflect the moving beam in such a manner that it forms the small notch 16 in the horizontal trace 15. Since these pulses are in exact phase with the sweep voltage wave, except for a constant shift of 90 degrees, the notch 16 will remain stationary and, because of the 90 degree shift, will appear in the center of the trace 15. One method of generating a square notch is shown in the application of A. G. Fox, Serial No. 448,099, filed June 23, 1942.

The formation and control of the range image mark 17 will now be described. A wave from the original source 19 is taken from the output circuit of the amplifier 20 and applied to the student's phase shifter 13. The output circuit from the phase shifter 13 leads through the normal contacts of key 32 to the rectifier 33. The rectifier 33 converts the alternating wave into a series of half waves of like polarity. These half waves are then applied to an impulse generator 34 of any well-known type which serves to convert them into a series of sharp impulses. The output impulses from the generator 34 are amplified by an amplifier 35 and are then applied to the vertical plates 30 and 31 of the oscilloscope. It will be noted that one of these impulses is applied to the vertical plates for each sweep of the oscilloscope beam across the horizontal trace and that the only difference between the phase of the impulse and the phase of the sweep voltage is the shift introduced by the range phase shifter 1. Therefore, each time one of the sharp impulses is applied to the plates 30 and 31, the horizontal trace is deflected to form the image pip 17; and, since the time at which the image 17 is formed with respect to the commencement of the sweep varies in accordance with the movement of the phase shifter 1, the image 17 will move along the trace 15, representing to the student the changing range of the imaginary object. If the phase shifter 13 is set for zero phase, the image pip 17 will occur on one side or the other of the notch 16 depending upon the sense of the course being simulated, and its distance from the notch will correspond to the position of the imaginary object in this course.

Therefore, by operating the phase shifter 13 through a given distance, the student is able to introduce into the pip-forming wave a shift of phase which is just sufficient to bring the pip 17 into juxtaposition with the notch 16 and thereafter to introduce continuously a change in phase which is just sufficient to maintain the pip in the notch. As long as he can maintain the pip exactly located in the notch he is following the target accurately, and the instantaneous position of his phase shifter 13 may be taken as a measure of the instantaneous range of the moving object. While the primary purpose of the system is to train the student in the manual art of holding the pip in the notch, the phase shifter 13 may, if desirable, be equipped with indicating means 36 which is calibrated to represent the range values of the object under observation. Similarly, the phase shifter 1 at the instructor's position may be equipped with an indicating device 37 for indicating the range values of the generated course.

If it is desired to indicate to the student the presence of a fixed object within the scope of his observation in order that he may learn to discriminate between fixed objects and the moving object in which he is interested, a fixed object generator 38 is provided for this purpose. A wave taken from the original source 19 over circuit 39 is first rectified by the rectifier 40 to produce half waves of like polarity, and these half waves are then applied to the generator 38. Generator 38, which may be the same as generator 34, produces sharp impulses from these half waves and applies them through the amplifier 35 to the plates 30 and 31 of the oscilloscope. These sharp impulses cause the formation of the fixed object mark 18 on the screen (Fig. 2), and this mark will move along the horizontal trace 15 while the student is endeavoring to control the object mark 17 with respect to the notch 16.

The formation and control of the azimuth images is now to be described. It should be noted that the images representing the range and the images representing the azimuth angle of the imaginary object are displayed on the same oscilloscope 12 but not concurrently. The student may elect to observe either the range or the azimuth angle, or the instructor may make the election, during a given flight. This choice is made by means of the keys 32 and 41 which are illustrated at the student's position. With these keys in their normal position, as shown in the drawing, the system is in condition for observing the range, whereas in their alternate position the system is in condition for observing azimuth. If desirable, of course, some of the students may have their keys in one position to observe range and other students may have their keys in the opposite position during the same flight for observing azimuth.

If the student whose position is shown in Fig. 1 wishes to observe the azimuth angle for a given flight he throws keys 32 and 41 which in fact may be a single key, to the alternate position. In this case the sweep voltage wave is modified in such a manner that it produces two adjacent notches 42 and 43 in the center of the horizontal trace 15 (Fig. 3). The trace 15 is formed in the manner already described; a wave is taken from the range phase shifter 1, amplified by the amplifier 21, rectified by the rectifier 22, and applied to the generator 23 which generates the sweep voltage, and this voltage, after amplification, is applied to the horizontal plates 25 and 26. Also the notch in the horizontal trace is formed in the same manner. A wave taken from the amplifier 21 is subjected to a 90 degree phase shift by the phase shifter 27, rectified, and utilized by the generator 29 to produce a notch in the trace 15 for each sweep of the beam. The pip, however, instead of moving along the trace as it did in the case of range observation, is formed in exact juxtaposition with the notch. To this end a wave which has undergone the range phase shift and also the 90 degree phase shift is taken from the output circuit of the phase shifter 27 and applied over circuit 44 through the resistors 2 and 14 and through the interrupter 45 over circuit 46 through the alternate contacts of key 32 to the rectifier 33. After rectification this wave is utilized by the generator 34 to generate the sharp impulses which produce the pip or image mark on the horizontal trace when these impulses are applied to the vertical plates 30 and 31. Since these pip-forming impulses are now in exact phase with the wave which forms the notch in the horizontal trace, it follows that the pip or image mark is located precisely in the notch as illustrated in Fig. 3.

It was alluded to above that two image marks are required for observing the azimuth angle. These two marks are obtained as will now be explained by introducing a displacement in alternate sweeps of the beam. To effect this displacement the switch 45 is arranged to apply a small value of positive potential to the deflector plate 25 during one sweep of the beam and to apply a small negative potential to the plate on the succeeding sweep and to repeat this process. When the positive potential is applied from the battery 27, the notch-generating impulse occurs just before the beam reaches the center of the oscilloscope field. Therefore, a notch 42 (Fig. 3) is formed at the left of the center of the field. At this same instant the pip is formed and occurs exactly within the notch. On the next sweep of the beam negative potential is applied from the source 48, and the result is that the beam reaches a point just beyond the center of the field when the notch-forming impulses is applied by the generator 29. Accordingly, a second notch 43 is formed at the right-hand side of the notch 42. Similarly the pip mark formed concurrently with the notch 43 occurs in exact juxtaposition therewith. On the next sweep of the beam the source 47 is again applied, and the first notch 42 is repeated. Similarly on the succeeding sweep the notch 43 is repeated. This process occurs in such rapid succession that the effect is to form the two notches 42 and 43 and their pip marks 49 and 50 concurrently, the frequency of repetition being above the persistence of vision.

The azimuth angle of the imaginary object is represented to the student by the relative altitudes of the azimuth marks 49 and 50 on the oscilloscope screen. The altitudes of these marks are varied by the resistor 2 under the control of the course-generating motor 4. As the motors 3 and 4 rotate to generate the imaginary course, the brushes 51 and 52 move along their resistance wires 53 and 54 to vary accordingly the amplitude of the wave which forms the image marks 49 and 50. At the starting point A of the simulated course (Fig. 4) the marks 49 and 50 bear a definite relation to each other. They may, for example, be of equal amplitudes. As the imaginary object, however, moves along the course toward the mid-point C, the brushes 51 and 52 move along the associated resistance wires, causing one of the azimuth marks to increase in amplitude and the other to decrease. When the mid-point C is reached, namely when the azimuth angle α equals 90 degrees, the brushes reach the end of the resistance wires and the azimuth marks 49 and 50 reach their maximum amplitude difference. At this point the driving motor 4 or the brush operating motor 55 is reversed; the brushes 51 and 52 move back over their associated resistance wires, and the azimuth marks 49 and 50 vary accordingly in amplitude representing the azimuth angle of the imaginary object moving along the second half of the simulated course until finally the brushes return to their initial positions signifying the arrival of the imaginary object at the end point B of the simulated course.

In order to follow the azimuth angle α the student manipulates the hand-wheel 56 to drive the brushes 57 and 58 along their associated resistance wires 59 and 60. The variable resistors 2 and 14 are so related that the correct amount of movement of the hand-wheel 56 by the student will maintain the azimuth marks 49 and 50 at equal amplitudes. If the student is able to hold these marks at the same amplitude, he is accurately following the azimuth angle α of the imaginary object, and the instant position of the resistor 14 may be taken as a measure of this angle. For example, the scales 61 and 62 may be calibrated to indicate the azimuth angles in the first and second halves respectively of the course. Similarly the scales 63 and 64 afford similar indications at the instructor's position.

The purpose of the switch or interrupter 45 is to switch the conductor 46 alternately from one section of the resistors 2 and 14 to the other section thereof and at the same time to switch the conductor 65 from one to the other of the image spacing batteries 47 and 48. The switch 45 is driven or otherwise operated by a synchronous motor or any other suitable synchronous mechanism for performing this switching operation in the proper phase relation with respect to the sweep voltage. To this end the switch-operating mechanism 66 is operated by a wave taken from the amplifier 21; therefore, the interrupter contacts are opened and closed at the same frequency and in phase with the sweep voltage which produces the horizontal trace 15 on the screen 12.

While the student is endeavoring to follow the azimuth angle of the moving object, the fixed object mark 18 (Fig. 3) may be made to appear as above described on the screen and to move along the horizontal trace 15 in the same manner that it would if he were actually manipulating a radio object-locating system.

A brief description will now be given of the operation of the system. For this purpose it will first be assumed that the instructor desires to test the skill of the student in following the range of an imaginary airplane moving from point A to point B along the straight line course AB, the point of observation being assumed at O. The keys 32 and 41 are moved to the position shown in the drawings, the motors 3 and 4 are started, and the motor speed control device 11 is operated to move the resistance brushes 9 and 10 from the positions shown to the opposite ends of the resistance units 7 and 8 for the first half of the course and is then returned to the starting positions for the second half of the course. The shapes of these resistance units 7 and 8 are chosen to give the desired rate of change of range and azimuth angle by varying the speed of the motors 3 and 4 accordingly.

As the range motor 3 drives the phase shifter 1 through a suitable gear mechanism 5, the phase of the wave in the output circuit 67 varies to represent the changing value of the range line OA, which becomes shorter and shorter as the imaginary object moves from the points A toward the point C. This changing phase appears as heretofore described in the sweep voltage that produces the horizontal trace 15. Accordingly the wave taken from the source 19 and applied through the phase shifter 13 to the rectifier 33 and pulse generator 34 produces a range image mark 17 which moves along the horizontal trace 15. The student, observing the moving mark 17, operates the hand-wheel 68 to introduce into the pip-forming wave a phase change which is just sufficient to bring the mark 17 into juxtaposition with the notch 16 and then endeavors to hold it in that position. When the motor control device 11 has been moved to its extreme downward position, the imaginary airplane is at the mid-point C of its course, and the control device 11 is then moved back to its initial starting position to generate the second half of the course. The device 11 may be operated manually or, if desirable, it may be driven at any desired speed by a motor or other driving device.

Assume next that the student is to be tested in his ability to follow the azimuth angle. The course AB is generated in the same manner as that above described, but in this case the keys 32 and 41 are shifted to their alternate positions in order that the pair of stationary image pips may be formed on the screen instead of the single moving pip that represents range. As the azimuth motor 4 rotates to drive the brushes 51 and 52 toward the top end of the associated resistance wires 53 and 54, the amplitudes of the pip-forming waves are varied accordingly. Assume that at a given instant the switch 45 is in the position illustrated in the drawing. A circuit may now be traced from the output side of the amplifier 21 through the phase shifter 27, conductor 44, brush 51, resistance 53, conductor 70, resistance 59, brush 57, closed contact 71, conductor 46 and thence through the key 32, rectifier 33, generator 34 and amplifier 35 to the deflection plate 30. While the switch contact 71 is closed the voltage wave in the circuit traced produces an image mark 49, the amplitude of which depends upon the amount of resistance 53 and 59 included in the circuit. Since the brush 51 is moving upward at this time the resistance 53 is diminishing; therefore the amplitude of the voltage wave is increasing and the effect is to increase the amplitude of the image mark 49 on the screen. During this same interval the upper contact 72 is closed, and battery 47 is applied to the sweep circuit of the oscilloscope. The effect of this battery is, as above described, to produce the left-hand notch 42 and to locate the associated image mark 49 therein. An instant later the switch 45 shifts its contacts to the alternate position, and the circuit from conductor 44 may now be traced through the brush 52, resistance 54, conductor 73, resistance 60, brush 58, closed contact 74 to conductor 46. Also the contact 72 is closed in its lower position, and battery 48 is connected to the sweep circuit to form the right-hand notch 43 and its associated image mark. The amplitude of the image mark 50 depends upon the value of resistance 54 and resistance 60, and since the brush 52 is moving upward to include more and more resistance the effect is to decrease the amplitude of the mark 50. Thus, if we ignore for the moment the student's resistor 14, we see that the movement of the brushes of resistor 2 from their lower to their upper position for the first half of the course increases the amplitude of the image mark 49 and decreases that of the mark 50. The student, however, observing the changing amplitudes of the image marks, operates his hand-wheel 56 to introduce a compensating amount of resistance to maintain the amplitudes of these marks at equal values. When the brushes 51 and 52 have reached their uppermost position, marking the mid-point of the course, the motor 4 or the gear mechanism 6 may be reversed in any suitable manner to drive these brushes back to their initial position thus generating the azimuth angle for the second half of the course.

Since the amplifiers, phase shifters, rectifiers, pulse generators and certain other devices used herein are old and well known in the art, they have been illustrated conventionally for the sake of clearness and simplification. The phase shifters 1 and 13, for example, may be of any suitable type, such as the one shown and described in the patent to L. A. Meacham, 2,004,613 of June 11, 1935. The impulse generators 34 and 38 may also be of any suitable type, one such generating mechanism being shown in the patent to L. R. Wrathall, 2,117,752 of May 17, 1938. The notch generator 29 may be of any suitable type capable of generating notches or square-topped pulses. One such generator is shown and described in the application of A. G. Fox, Serial No. 448,099, filed June 23, 1942. The oscilloscope 12 may be any well-known cathode beam device in which potentials on the vertical and horizontal plates serve to cause the movement of the beam in the desired manner across the luminescent screen on which the images are formed.

What is claimed is:

1. In an apparatus for training students in the art of radio locators the combination of a source of base phase and frequency, means for varying the phase of a wave from said source in accordance with the changing position of a point movable over a given course, an oscilloscope, means responsive to said wave of varying phase for generating a linear trace on the oscilloscope screen, means responsive to said wave of varying phase for producing a reference mark in said trace, means responsive to a wave of the base phase for producing in said trace a moving object mark representing the location of said point, and means controlled by the student for varying the phase of said last-mentioned base wave to move said object mark into juxtaposition with said reference mark.

2. In an apparatus for training students in the art of radio locators the combination of a source of waves having a base phase, means for varying the phase of a wave from said source in accordance with the range from a reference point of an imaginary object moving in a given course, an oscilloscope, means responsive to said wave of varying phase for generating a visible trace on the oscilloscope screen, means responsive to said wave of varying phase for producing a reference mark in said trace, means responsive to a wave of the base phase for producing in said trace a moving object mark representing the range of the imaginary object, and means controlled by the student for varying the phase of said last-mentioned wave to move said object mark into juxtaposition with said reference mark.

3. In an apparatus for training students in the art of object location the combination of a source of waves of base phase, means for varying the phase of a wave from said source in accordance with the range of a point movable along a given course, an oscilloscope, means responsive to said wave of varying phase for sweeping the oscilloscope beam in like phase to generate a visible trace on the screen of said oscilloscope, means responsive to said wave of varying phase for producing a stationary reference mark in said trace, means responsive to a wave of the base phase for producing in said trace an object mark which moves across said screen by reason of the changing phase of the beam sweep to represent the changing range of said movable point, and means controlled by the student for arresting the movement of said object mark and for holding it in juxtaposition with said reference mark to obtain a continuous measurement of the range of said movable point.

4. In an apparatus for training students in the operation of radio object locators the combination of a source of waves of base phase, means for varying the phase of a wave from said source to simulate the changing range of an imaginary object moving through an imaginary course, an oscilloscope, means responsive to said wave of varying phase for sweeping the oscilloscope beam in like phase to generate a linear trace on the oscilloscope screen, means responsive to said wave of varying phase for producing a stationary reference mark in said trace, means responsive to a wave of the base phase for producing in said trace an object mark which moves across said screen to represent the changing range of the imaginary object, means controlled by the student for arresting the movement of said object mark and for holding it in juxtaposition with said reference mark, and means responsive to a wave of the base phase for producing in said trace a second object mark which simulates the presence of a fixed object and which moves across said screen while the student is maintaining said first object mark in a fixed stationary position.

5. In an apparatus for training students in the operation of radio object locators the combination of a source of waves of base phase, means for varying the phase of the waves from said source to simulate the changing range of a point movable through a given course, an oscilloscope, means responsive to one of said waves of varying phase for sweeping the oscilloscope beam in like phase to generate a visible trace on the oscillosope screen and for producing a plurality of reference marks in said trace, means responsive to one of said waves of varying phase for producing object marks in juxtaposition with said reference marks respectively, means for controlling said last-mentioned wave to control said object marks in accordance with the changing angle defining the location of said movable point, and means operated by the student for controlling said object marks to derive said changing angle.

6. In an apparatus for training students in the operation of radio object locators the combination of a source of waves of base phase, means for varying the phase of the waves from said source to simulate the changing range of an imaginary object moving through an imaginary course, an oscilloscope, means responsive to one of said waves of varying phase for sweeping the oscilloscope beam in like phase to generate a visible trace on the oscilloscope screen and for producing a plurality of stationary reference notches in said trace, means responsive to one of said waves of varying phase for producing peaked object marks in said reference notches, means for varying said last-mentioned wave to change the relative amplitudes of said object marks to simulate the changing azimuth angle of said imaginary object, and means operated by the student for obtaining a continuous measure of said azimuth angle by varying said last-mentioned wave to maintain said object marks at equal amplitudes.

ERNEST G. ANDREWS.
ORFEO CESAREO.

REFERENCES CITED

The following references are of record in the file of this patent:

UNITED STATES PATENTS

| Number | Name | Date |
|---|---|---|
| 2,004,613 | Meacham | June 11, 1935 |
| 2,117,752 | Wrathall | May 17, 1938 |
| 1,939,706 | Karnes | Dec. 19, 1933 |
| 2,321,799 | Cone | June 15, 1943 |